US010822279B2

(12) United States Patent
Shim et al.

(10) Patent No.: US 10,822,279 B2
(45) Date of Patent: Nov. 3, 2020

(54) REDUCING SURFACE NODULES IN MELT-INFILTRATED CERAMIC MATRIX COMPOSITES

(71) Applicant: Rolls-Royce High Temperature Composites, Inc., Cypress, CA (US)

(72) Inventors: Sungbo Shim, Irvine, CA (US); Robert Shinavski, Mission Viejo, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 63 days.

(21) Appl. No.: 15/499,960

(22) Filed: Apr. 28, 2017

(65) Prior Publication Data

US 2017/0313627 A1    Nov. 2, 2017

Related U.S. Application Data

(60) Provisional application No. 62/330,560, filed on May 2, 2016.

(51) Int. Cl.
*C04B 35/80* (2006.01)
*C04B 35/628* (2006.01)
(Continued)

(52) U.S. Cl.
CPC .......... *C04B 35/806* (2013.01); *C04B 35/563* (2013.01); *C04B 35/565* (2013.01); *C04B 35/5607* (2013.01); *C04B 35/573* (2013.01); *C04B 35/584* (2013.01); *C04B 35/6263* (2013.01); *C04B 35/6264* (2013.01); *C04B 35/62863* (2013.01); *C04B 35/62892* (2013.01);
(Continued)

(58) Field of Classification Search
CPC .................................................... C04B 35/806
USPC .......................................................... 427/419.7
See application file for complete search history.

(56) References Cited

U.S. PATENT DOCUMENTS 4,242,106 A  *  12/1980  Morelock ................ B24D 3/08
                                                        264/29.1
5,015,540 A      5/1991  Borom et al.
(Continued)

FOREIGN PATENT DOCUMENTS

DE    102007063517 B3    1/2009
EP         1683771 A1    7/2006
(Continued)

OTHER PUBLICATIONS

Abramshe, Effective Cleaning Methods and Best Practices of Synthetic Industrial Diamond, Mar. 1, 2007, p. 1-8 (Year: 2007).*
(Continued)

*Primary Examiner* — Tabatha L Penny
(74) *Attorney, Agent, or Firm* — Shumaker & Sieffert, P.A.

(57) ABSTRACT

In some examples, a technique for infiltrating a porous preform with a slurry to form an infiltrated-preform, where the slurry includes a plurality of solid particles, where the plurality of solid particles include a plurality of fine ceramic particles defining an average fine particle diameter, a plurality of coarse ceramic particles defining an average coarse particle diameter, and a plurality of diamond particles, where the average fine particle diameter is less than the average coarse particle diameter, and infiltrating the infiltrated-preform with a molten metal infiltrant to form a ceramic matrix composite (CMC) article.

20 Claims, 5 Drawing Sheets

(51) Int. Cl.
  *C04B 35/657* (2006.01)
  *C04B 35/565* (2006.01)
  *C04B 35/65* (2006.01)
  *C04B 35/56* (2006.01)
  *C04B 35/626* (2006.01)
  *C04B 35/563* (2006.01)
  *C04B 35/573* (2006.01)
  *C04B 35/584* (2006.01)

(52) U.S. Cl.
  CPC ........ *C04B 35/62894* (2013.01); *C04B 35/65* (2013.01); *C04B 35/657* (2013.01); *C04B 2235/3821* (2013.01); *C04B 2235/3826* (2013.01); *C04B 2235/3839* (2013.01); *C04B 2235/3873* (2013.01); *C04B 2235/427* (2013.01); *C04B 2235/428* (2013.01); *C04B 2235/524* (2013.01); *C04B 2235/5224* (2013.01); *C04B 2235/5228* (2013.01); *C04B 2235/5232* (2013.01); *C04B 2235/5244* (2013.01); *C04B 2235/5436* (2013.01); *C04B 2235/5445* (2013.01); *C04B 2235/5472* (2013.01); *C04B 2235/616* (2013.01)

(56) References Cited

U.S. PATENT DOCUMENTS

| | | |
|---|---|---|
| 5,840,221 A | 11/1998 | Lau et al. |
| 5,952,100 A | 9/1999 | Corman et al. |
| 6,245,424 B1 * | 6/2001 | Lau .................. B28B 1/265 428/368 |
| 6,403,158 B1 | 6/2002 | Corman |
| 6,609,452 B1 | 8/2003 | McCormick et al. |
| 6,820,334 B2 | 11/2004 | Kebbede et al. |
| 6,855,428 B2 | 2/2005 | Lau et al. |
| 7,378,362 B2 | 5/2008 | Nixon et al. |
| 7,686,990 B2 | 3/2010 | Gray |
| 7,842,335 B2 | 11/2010 | Skoog et al. |
| 7,942,638 B2 | 5/2011 | Eichmann et al. |
| 8,043,720 B2 | 10/2011 | Corman et al. |
| 8,474,362 B1 | 7/2013 | Karandikar et al. |
| 8,846,218 B2 | 9/2014 | Bouillon et al. |
| 9,238,595 B2 | 1/2016 | Bouillon et al. |
| 9,713,912 B2 | 7/2017 | Lee |
| 2005/0158171 A1 | 7/2005 | Carper et al. |
| 2005/0276931 A1 | 12/2005 | Che et al. |
| 2006/0147622 A1 | 7/2006 | Gray |
| 2006/0163773 A1 | 7/2006 | Gray |
| 2007/0075455 A1 | 4/2007 | Marini et al. |
| 2007/0092762 A1 | 4/2007 | Corman et al. |
| 2011/0268577 A1 | 11/2011 | Bouillon et al. |
| 2013/0009348 A1 | 1/2013 | Murata et al. |
| 2013/0122259 A1 | 5/2013 | Lee |
| 2013/0287941 A1 | 10/2013 | Gray |
| 2014/0272274 A1 | 9/2014 | Lazur |
| 2015/0004324 A1 | 1/2015 | Bouillon et al. |
| 2016/0101561 A1 | 4/2016 | Walston et al. |
| 2016/0159066 A1 | 6/2016 | Landwehr et al. |
| 2016/0214907 A1 | 7/2016 | Shim et al. |
| 2016/0230570 A1 | 8/2016 | Harris et al. |
| 2016/0279744 A1 | 9/2016 | Harris |
| 2016/0326064 A1 | 11/2016 | Shim et al. |
| 2016/0356163 A1 | 12/2016 | Freeman et al. |
| 2017/0247787 A1 | 8/2017 | Saha et al. |
| 2017/0313627 A1 | 11/2017 | Shim et al. |
| 2017/0313629 A1 | 11/2017 | Shim et al. |
| 2019/0185384 A1 | 6/2019 | Shim et al. |
| 2019/0256427 A1 | 8/2019 | Shim et al. |

FOREIGN PATENT DOCUMENTS

| | | |
|---|---|---|
| EP | 1636148 B1 | 7/2010 |
| EP | 3050863 A1 | 8/2016 |
| EP | 3135866 A1 | 3/2017 |
| EP | 3241817 A1 | 11/2017 |
| JP | 2000344582 * | 12/2000 |
| JP | 2000344582 A | 12/2000 |
| WO | 9824737 A1 | 6/1998 |

OTHER PUBLICATIONS

Extended European Search Report from counterpart European Application No. 17164903.1, dated Sep. 21, 2017, 6 pp.

Communication Pursuant to Rule 69 EPC and 70a(1) EPC, dated Nov. 13, 2017, from counterpart European Application No. 17164903.1, 2 pp.

Response to Extended European Search Report, dated Sep. 21, 2017, and Communication pursuant to Rule 69 EPC and 70a(1) EPC, dated Nov. 13, 2017, from counterpart European Application No. 17164903.1, filed May 2, 2018, 4 pp.

Notice of Intent to Grant and Text Intended to Grant from counterpart European Application No. 17164903.1, dated Aug. 9, 2019, 34 pp.

Examination Report from counterpart European Application No. 17164901.1, dated Mar. 3, 2019, 6 pp.

Response to Examination Report dated Mar. 4, 2019, from counterpart European Application No. 17164903.1, filed Jun. 26, 2019, 49 pp.

"Ceramic matrix composite," wikipedia.org, retrieved from https://en.wikipedia.org/wiki/Ceramic_matrix_composite on Oct. 25, 2019, 12 pp.

"Duramax Binders," The Dow Chemical Company, Form No. 233-01075-MM-0513, May 13, 2013, 5 pp.

* cited by examiner

REDUCING SURFACE NODULES IN MELT-INFILTRATED CERAMIC MATRIX COMPOSITES

This application claims the benefit of U.S. Provisional Application No. 62/330,560, filed May 2, 2016, and titled, "REDUCING SURFACE NODULES IN MELT-INFILTRATED CERAMIC MATRIX COMPOSITES," the entire content of which is incorporated herein by reference.

TECHNICAL FIELD

The present disclosure generally relates to techniques for forming a melt-infiltrated ceramic matrix composite.

BACKGROUND

Ceramic matrix composite (CMC) materials may be useful in a variety of contexts where mechanical and thermal properties are important. For example, components of high temperature mechanical systems, such as gas turbine engines, may be made from CMCs. CMCs may be resistant to high temperatures, but some CMCs may react with some elements and compounds present in the operating environment of high temperature mechanical systems, such as water vapor. These reactions may damage the CMC and reduce mechanical properties of the CMC, which may reduce the useful lifetime of the component. A CMC component may be coated with an environmental barrier coating, which may reduce exposure of the CMC component to elements and compounds present in the operating environment of high temperature mechanical systems.

SUMMARY

In some examples, the disclosure describes techniques for infiltrating a porous preform with a slurry to form an infiltrated-preform, where the slurry includes a plurality of solid particles, where the plurality of solid particles include a plurality of fine ceramic particles, a plurality of coarse ceramic particles, and a plurality of diamond particles, and infiltrating the infiltrated-preform with a molten metal infiltrant to form a ceramic matrix composite (CMC) article.

In some examples, the disclosure describes an article that includes a porous preform that includes a plurality of fibers and defines a plurality of pores, and a mixture of solid particles that includes a plurality of fine ceramic particles, a plurality of coarse ceramic particles, and a plurality of diamond particles, where the mixture of solid particles is disposed in at least some pores of the plurality of pores.

The details of one or more examples are set forth in the accompanying drawings and the description below. Other features, objects, and advantages will be apparent from the description and drawings, and from the claims.

DETAILED DESCRIPTION

Figure 1:
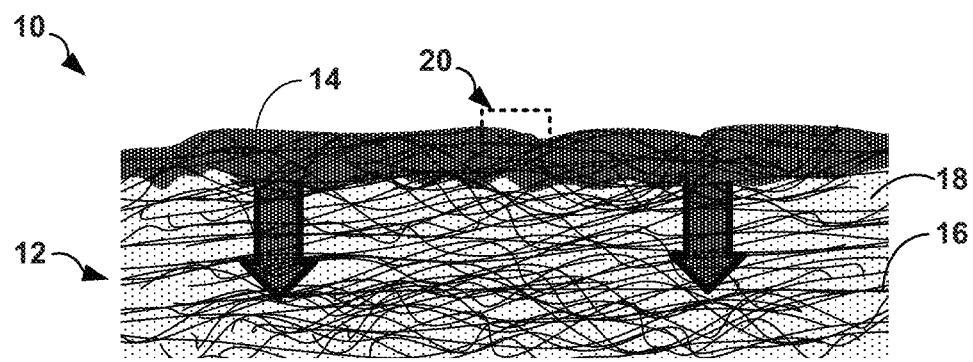
FIG. 1 is a conceptual diagram illustrating a cross-sectional view of an example article that includes a porous preform at least partially infiltrated with a slurry mixture.

The disclosure describes techniques for producing a ceramic matrix composite (CMC). In some examples, the described techniques may be used to reduce the production of nodules on the surface of a ceramic matrix composite (CMC) that might otherwise form during melt-infiltration of a porous preform. In some examples, porous preforms may be infiltrated with molten metal (e.g., silicon or silicon alloy) in order densify and reinforce the matrix material of the preform by consuming free carbon and producing metal carbide (e.g., silicon carbide (SiC)). In some examples, excess metal or metal alloy from the melt-infiltrant may be exuded from the porous preform during the melt infiltration process and form surface nodules (e.g., silicon nodules) of the metal or metal alloy infiltrant on the resultant CMC article. In some examples, the surface nodules may be removed through subsequent machining; however, such techniques can damage the underlying CMC, leading to fractures of other imperfections in the surface of the CMC article, which may ultimately reduce the useful service life of the CMC article.

In some examples, the formation of the surface nodules as a result of the melt-infiltration process may be reduced or eliminated by initially infiltrating the porous preform with a slurry that includes a mixture of solid particles comprising coarse ceramic particles, fine ceramic particles, and diamond particles. In some such examples, the mixture of coarse, fine, and diamond particles may help reduce the formation of surface nodules during the melt-infiltration processing by, for example, providing a carbon source (e.g., diamond) that can react with and consume the molten metal or metal alloy to form metal carbides (e.g., SiC), which can help eliminate the flow paths around the deposited solid particles and porous preform. For example, like water, molten silicon is more dense that pure solid silicon. As a result, during a melt-infiltration process using molten silicon or silicon alloy, excess silicon metal may to expand as it cools and solidifies. In some examples, during the phase transition, the excess silicon metal may cause the silicon metal to expand and be driven out of the infiltrated-preform, resulting in the formation and growth of silicon nodules on the surface of the resultant CMC article. In some examples, because of the relative density of diamond compared to the resultant carbides, the conversion of diamond to carbide (e.g., SiC) may impede the ability of the molten metal infiltrant (e.g., molten silicon or silicon alloy) to expand and flow out of the porous preform to form surface nodules. The resultant CMC article may exhibit a reduced or minimal presence of surface nodules (e.g., silicon nodules) on the surface of the CMC.

In some examples, the described techniques may increase the solid content and reduce the porosity of the resultant CMC to provide a CMC article with a higher density compared to those produced through conventional techniques. Additionally or alternatively, the incorporation of diamond particles in the slurry mixture may provide a substantially pure carbon source (e.g., free or nearly free of impurities) that may reduce deleterious reactions between unwanted impurities and the underlying CMC materials. In some examples, diamond particles may exhibit about three times higher purity content compared to other carbon sources such as graphite. In some examples the diamond particles my exhibit a calcium impurity content of less than about 0.05 percent by weight (wt. %) and an iron impurity content of less than about 0.05 wt. %.

FIG. 1 is a conceptual diagram illustrating a cross-sectional view of an example article 10 that includes a porous preform 12 that is at least partially infiltrated with a slurry mixture 14. In some examples, article 10 may be a component of a high temperature mechanical system. For example, article 10 may be a seal segment, a blade track, an airfoil, a blade, a vane, a combustion chamber liner, or the like, of a gas turbine engine.

Porous preform 12 may include a plurality of fibers 16 and optional fiber interface material 18. Fibers 16 may be continuous or discontinuous, woven or non-woven fibers including, for example, tows, whiskers, platelets, particulates or the like. In some examples, fibers 16 may be arranged as one or more layers of fibers 16 such as a multilayer stack of woven fabrics. In some examples, fibers 16 may be composed of SiC, $Si_3N_4$, $Al_2O_3$, aluminosilicate, $SiO_2$, or the like.

In some examples, fibers 16 may be initially coated with an optional fiber interface material 18 that may be used to rigidize fibers 16, densify porous preform 12, or both, prior to the application of slurry mixture 14. In some examples, fiber interface material 18 may include, for example, pyrolytic carbon (PyC), boron nitride (BN), or the like and may be deposited on fibers 16 using any suitable technique such as chemical vapor infiltration (CVI), chemical vapor deposition (CVD), or the like. In some examples, fiber interface material 18 may help to rigidize resultant porous preform 12 to provide a relatively durable preform that is less prone to being damaged during subsequent processing.

Figure 2:
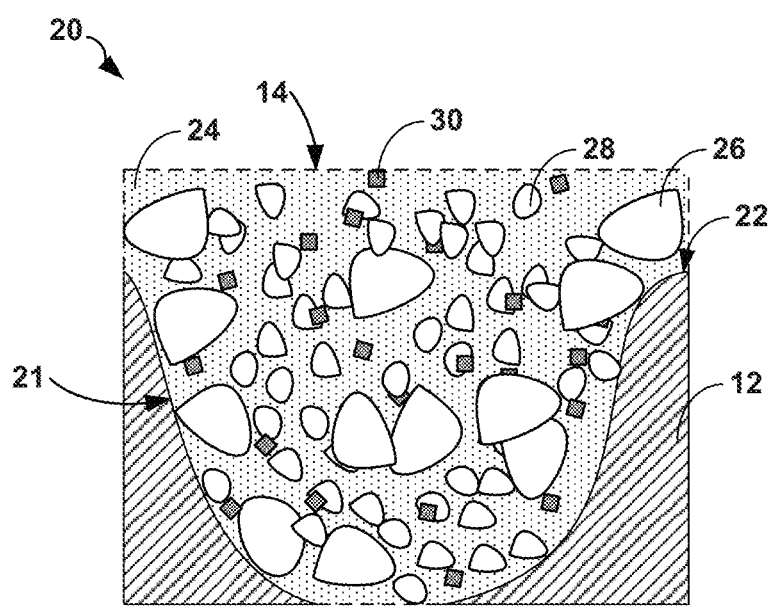
FIG. 2 is an enlarged view of an example slurry mixture at least partially infiltrating a porous preform (e.g., enlarged view of the article of FIG. 1).

Porous preform 12 may include a plurality of pores (e.g., pores 21 of FIG. 2). In some examples, the pores of porous preform 12 may be interconnected such that the pores extend throughout porous preform 12, which may allow slurry mixture 14 to infiltrate throughout the entire thickness of porous preform 12. In other examples, the pores of porous preform 12 may be partially interconnected or non-interconnected, in which slurry mixture 14 may infiltrate surface pores of porous preform 12 rather than throughout the entire thickness of porous preform 12. The use of porous preform 12 and pores 21 is used to describe all of the possible constructions and is not intended to be limited to a specific configuration.

FIG. 2 is an enlarged view of slurry mixture 14 applied to outer surface 22 of porous preform 12 (e.g., enlarged view of area 20 of article 10 of FIG. 1). As shown in FIG. 2, slurry mixture 14 at least partially infiltrates at least some pores 21 of porous preform 12.

Slurry mixture 14 may include one or more carrier materials 24 (e.g., solvents), combined with a plurality solid particles including, for example, a plurality of coarse ceramic particles 26, a plurality of fine ceramic particles 28, and a plurality of diamond particles 30 (collectively "solid particles 26, 28, 30"). Upon infiltration of porous preform 12 with slurry mixture 14, slurry mixture 14 may be dried to remove the one or more carrier materials 24 leaving behind solid particles 26, 28, 30 within the pores 21 to produce an infiltrated-preform (e.g., infiltrated-preform 36 of FIG. 3). Subsequently, the infiltrated-preform may be subjected to a melt infiltration process to densify porous preform 12 and react diamond particles 30 with a metal infiltrant to convert diamond particles 30 to a metal carbide (e.g., SiC) and produce a CMC article (e.g., CMC article 40 of FIG. 4). In some examples, as described further below, the combination of solid particles 26, 28, 30 help reduce or inhibit the growth of surface nodules (e.g., silicon nodules) on the exterior surface of the resultant CMC article that may otherwise result from the melt infiltration process.

Slurry mixture 14 may include one or more carrier materials 24. The one or more carrier materials 24 may assist with the deposition of solid particles 26, 28, 30 within at least some pores 21 of porous preform 12. In some examples, the carrier material may include at least one solvent compatible with solid particles 26, 28, 30, including, for example, water, ethanol, isopropyl alcohol, methyl ethyl ketone, toluene, or the like. In some examples, slurry mixture 14 may include about 30 percent by volume (vol. %) to about 60 vol. % carrier material and about 70 vol. % to about 40 vol. % solid materials (e.g., solid particles 26, 28, 30). During drying of slurry mixture 14, the carrier material may be substantially removed (e.g., removed or nearly removed) from porous preform 12, leaving behind the solid contents of slurry mixture 14 (e.g., solid particles 26, 28, 30).

Slurry mixture 14 also includes a plurality of coarse ceramic particles 26 and fine ceramic particles 28. The coarse and fine ceramic particles 26 may include particles of silicon carbide (SiC), silicon nitride ($Si_3N_4$), boron carbide ($B_4C$), Molybdenum carbide ($Mo_2C$), or a combination thereof. In some examples, coarse ceramic particles 26 may define an average particle size of between about 10 micrometers (μm) and about 20 μm, with a standard deviation of less than about ±3 μm. In some examples, fine ceramic particles 26 may define an average particle size of about 0.5 μm to about 5 μm, with a standard deviation of less than about ±0.5 μm. In some examples, coarse ceramic particles 26 may account for about 40 vol. % to about 50 vol. % of the solid material in slurry mixture 14 and fine ceramic particles 28 may account for about 40 vol. % to about 59 vol. % of the solid material in slurry mixture 14. In some examples, the volumetric ratio of coarse ceramic particles 26 to fine ceramic particles 28 may between about 0.1:1 to about 2:1. In some examples, the volumetric ratio of coarse ceramic particles 26 to fine ceramic particles 28 may be about 1:1.

In some examples, plurality of fine ceramic particles 28 may increase the relative amount of solid material that becomes infiltrated in porous preform 12 due to ability of the smaller size particles to infiltrate smaller pores 21 of porous preform 12 compared to coarse ceramic particles 26. Additionally or alternatively, fine ceramic particles 28 may also increase the capillary force among solid particles 26, 28, 30 of the resultant infiltrated-preform, which may help reduce the exudation of the molten infiltrant (e.g., silicon or silicon alloy) and reduce the formation of surface nodules on the final CMC article.

In some examples, coarse ceramic particles 26 may deliver a relatively high content of ceramic material with during the slurry infiltration process. Additionally or alternatively, coarse ceramic particles 26 may help to maintain sufficiently sized interstices (e.g., pathways) within the infiltrated and dried solid particles 26, 28, 30 of porous preform 12 to allow for infiltration of the molten infiltrant during subsequent processing. Additionally or alternatively, in some examples, the presence of coarse ceramic particles 26 in slurry mixture 14 may help reduce or prevent shrinkage and or cracking as slurry mixture 14 is dried into the deposited structure of solid particles 26, 28, 30.

Slurry mixture 14 also includes a plurality of diamond particles 30. In some examples, the amount and size of diamond particles 30 may be selected so substantially all (e.g., all or nearly all) of the diamond particle material reacts with the metal or metal alloy infiltrant to form a metal carbide that that substantially fills the interstices (e.g., pathways) between the infiltrated coarse and fine ceramic particles 26 and 28 and porous preform 12. In some examples, diamond particles 30 may define an average diamond particle diameter between about 0.1 µm to about 5 µm and account for between about 1 vol. % and about 10 vol. % of the solid material in slurry mixture 14. In some examples the diamond particles 30 may account for between about 2 vol. % and about 10 vol. % of the solid material in slurry mixture 14, or between about 3 vol. % and about 10 vol. % of the solid material in slurry mixture 14.

As described above, in some examples, diamond particles 30 provide a source of carbon that may react with the molten metal infiltrant material (e.g., molten silicon or molten silicon alloy) during the melt infiltration process to form a metal carbide (e.g., SiC). In some examples, the relative size of diamond particles 30 may be sufficiently small such that substantially all (e.g., all or nearly all) of diamond particles 30 are converted to metal carbide as a result of the melt infiltration process. Smaller particles may be more efficiently converted to metal carbide due to a higher surface area-to-volume ratio of diamond particles 30.

In some examples, slurry mixture 14 may also include one or more optional additives. Such additives may be used to tailor or alter the properties of slurry mixture 14. For example, the one or more optional additives may include a binder (e.g., polyethylene glycol, acrylate co-polymers, latex co-polymers, polyvinyl pyrrolidone co-polymers, polyvinyl butyral, or the like), a dispersant (e.g., ammonium polyacrylate, polyvinyl butyral, a phosphate ester, polyethylene imine, BYK® 110 (available from Byk USA, Inc., Wallingford Conn.), or the like), or the like. In some examples, other additives such as a surfactant (e.g., Dynol™ 607 surfactant available from Air Products) may be included in the slurry mixtures to improve wetting of the slurry. The selection and amount of the one or more optional additive components may depend on the intended application for article 10. In some examples, the one or more optional additives may account for up to about 20 vol. % of slurry mixture 14.

In some examples, the relative amount of solid particles 26, 28, 30 in slurry mixture 14 may allow slurry mixture 14 to maintain a workable viscosity (e.g., less than about 1000 centipoise (cP)) yet obtain a relatively high solid loading content of solid particles 26, 28, 30 (e.g., about 60 vol. %) compared to other materials. The relatively high solid loading content of slurry mixture 14 may improve the efficiency of the slurry infiltration process (compared to a slurry mixture with a lower solids loading content), facilitate producing a high density CMC article, or both. Additionally or alternatively, in some examples, the relatively high solid loading content of slurry mixture 14 may also reduce that amount of molten metal infiltrant material used to during subsequent melt infiltration cycles and, ultimately, may reduce an amount of excess metal infiltrant left in the final CMC article. Because unreacted metal infiltrant (e.g., silicon or silicon alloy) may negatively affect properties of the final CMC article, reducing the amount of metal infiltrant in the final CMC article may improve properties of the article.

Slurry mixture 14 including solid particles 26, 28, 30 may provide one or more advantages compared to other slurry mixtures or slurry mixtures that exclude one or more of solid particles 26, 28, 30. For example, including coarse ceramic particles 26, fine ceramic particles 28, and diamond particles 30 may help increase the amount of solid particles (e.g., ceramic materials) introduced into porous preform 12 during the slurry infiltration process by improving packing of solid particles 26, 28, 30 compared to particles with a single size. In some examples, the relative ratio of coarse ceramic particles 26 to fine ceramic particles 28 to diamond particles 30 may be selected to provide a selected amount of solid particles (e.g., ceramic materials) into porous preform 12 while maintaining sufficiently sized interstices within the deposited solid particles 26, 28, 30 (e.g., the pathways or spacing between adjacent particles) to allow the molten metal infiltrant to penetrate the inner recesses of the porous preform 12.

In some examples, diamond particles 30 provide one or more advantages compared to other carbon sources such as carbon black or graphite. For example, diamond particles 30 may contain a lower quantity of impurities compared to other carbon sources, which may correspond to a lower amount of impurities in the resultant CMC article. Diamond particles 30 also have a higher relative density (e.g., about 3.5 g/cm$^3$) compared to other carbon sources (e.g., density of carbon black is about 1.8-2.1 g/cm$^3$). As a result, the amount of carbon loading in slurry mixture 14 (e.g., weight percent (wt. %) of free carbon in the slurry) may be much higher for diamond particles 30 compared to other carbon sources added to the slurry utilizing the same relative volume percentage. Additionally, diamond particles 30 have been found to have a relatively small impact on the viscosity of slurry mixture 14 compared to other carbon sources. As a result, the volume percentage of diamond particles 30 added to slurry mixture 14 may be relatively high (e.g., about 10 vol. %) compared to other carbon sources without significantly increasing the viscosity of slurry mixture 14. A slurry mixture 14 with viscosity that is too high is no longer viable as a slurry infiltrant. In some examples, the combination of the higher density of diamond particles 30 and the higher volume percentage of diamond particles 30 added to slurry mixture 14 compared to other carbon sources may significantly increase the amount of carbon material infiltrated into porous preform 12, significantly increase the density of the solid material infiltrated into porous preform 12, or a combination of both to form a CMC article with a higher relative density and a lower amount of residual metal infiltrant.

Additionally or alternatively, diamond particles 30 may result in a more efficient infiltration process as the molten metal infiltrant is introduced and reacts with diamond particles 30 to form metal carbide (e.g., conversion of molten silicon to SiC), compared to other carbon sources, thereby reducing the relative amount of molten metal infiltrant introduced into the infiltrated-preform. As described above, in some examples, the melt infiltration process may help improve the overall density of final CMC article, however, unreacted molten metal infiltrant (e.g., silicon or silicon alloy) which may remain as a result of the infiltration process imbedded in the CMC article can negatively impact the durability and useful life of the resultant CMC. The high solid loading content and relative amount of solid particles 26, 28, 30 in slurry mixture 14 may help reduce the amount of molten metal infiltrant material introduced into article 10 during the melt infiltration process, improve the efficiency in which molten metal infiltrant material is converted to metal carbide by reaction with diamond particles 30, reduce the amount of excess molten metal infiltrant remaining in the infiltrated-preform at the end of the melt infiltration process, or a combination thereof.

In some examples, the presence of diamond particles 30 in slurry mixture 14 may also help reduce or inhibit the growth of surface nodules (e.g., silicon nodules) on the exterior surface of the resultant CMC article that may otherwise form on the surface of a CMC as a result of a melt infiltration process. For example, without wanting to be bound to a specific scientific theory, it is believed that the silicon nodules form as a result of excess silicon from the silicon melt infiltration process expanding as the silicon solidifies, thereby driving the excess silicon material out of the porous preform and resulting in the growth of silicon nodules on the external surface of the CMC article. In some examples, the silicon nodules may be removed from the exterior surface of the CMC article though additional machining; however, such techniques may crack or otherwise damage the CMC article, thereby reducing the useful life of the article.

The presence of diamond particles 30 may help reduce or inhibit the formation of silicon nodules on the surface of the CMC article by reacting with the molten silicon infiltrant to form SiC. Additionally or alternatively, as the reaction progresses, the relatively high density of diamond particles 30 (e.g., about 3.5 g/cm$^3$) compared to other carbon sources (e.g., carbon black is about 1.8-2.1 g/cm$^3$), and compared to the relative density of SiC (e.g., 3.2 g/cm$^3$) may cause the volumetric space occupied by the SiC produced by the conversion of diamond particles 30 to be relatively high compared to a conversion process using other carbon sources. In some examples, the described conversion process may cause the interstices (e.g., pathways) between the infiltrated coarse and fine ceramic particles 26 and 28 to become constricted or closed as diamond particles 30 are converted to SiC. As a result of the process, the constricted interspatial pathways between the infiltrated coarse and fine ceramic particles 26 and 28 may reduce or inhibit any excess silicon, to the extent present, from exiting porous preform 12 during the solidification process and forming silicon nodules on the exterior surface of the CMC article. In contrast to diamond particles 30, other carbon sources may increase or maintain relatively large sized interstices between coarse and fine ceramic particles 26 and 28 as the carbon source is converted to metal carbide, thereby maintaining pathways for which excess silicon may exit porous preform 12 to form silicon nodules.

During the slurry infiltration process, slurry mixture 14 may be deposited on porous preform 12 using any suitable means including, for example, spraying, dip coating, transfer molding, pressure or vacuum infiltration, painting, or the like. In some examples, a vacuum may optionally be drawn prior to slurry introduction to purge gas from inner pores 21 of porous preform 12 to further enhance the infiltration process. The slurry infiltration may be conducted at any suitable temperature, including room temperature (between about 20° C. and about 35° C.). In some examples, infiltration of slurry mixture 14 may be enhanced by application of external pressure after slurry introduction, such as a pressure gradient of about one atmosphere. During the slurry infiltration process, slurry mixture 14 may be allowed to infiltrate at least some pores 21 porous preform 12.

In some examples, porous preform 12 may be infiltrated with slurry mixture 14 using a mold. For example, porous preform 12 may be placed and sealed in the inner cavity of a mold. Slurry mixture 14 may be injected into the mold under pressure allowing solid particles 26, 28, 30 of slurry mixture to infiltrate at least some of pores 21. In some examples, the mold may be configured to define an inner cavity sufficiently sized to allow for the formation of outer surface layer 32 during the infiltration process. The mold may be formed of any suitable material including, for example, graphite, silica, alumina, or the like. The material from which the mold is formed may be selected to allow release of article 10 after completion of the infiltration step, and to be sufficiently non-reactive with the materials used in forming article 10.

Figure 3:
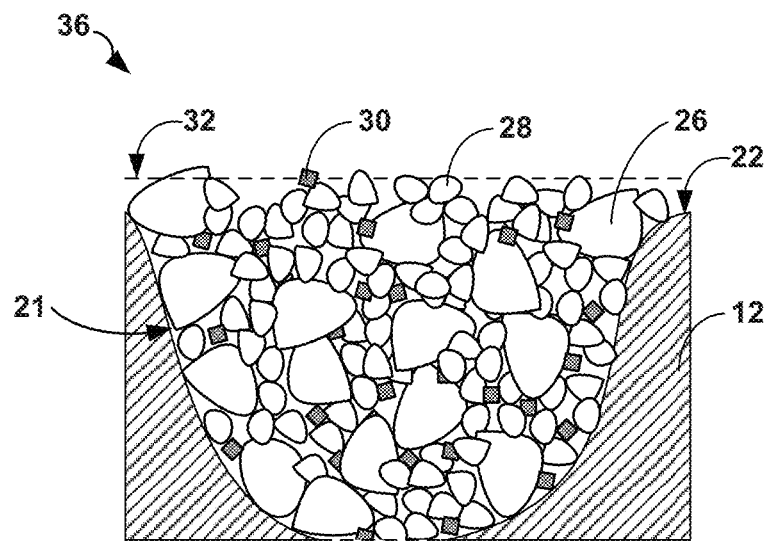
FIG. 3 is an enlarged view (e.g., enlarged view of the article of FIG. 1) of an example infiltrated-preform after a slurry mixture has been deposited and dried on the porous preform.

After infiltration, slurry mixture 14 may be dried to remove carrier materials 24, leaving behind the solid contents slurry mixture 14 (e.g., solid particles 26, 28, 30). FIG. 3 is an enlarged view (e.g., enlarged view of area 20 of article 10 of FIG. 1) of an example infiltrated-preform 36 after slurry mixture 14 has been deposited and dried on and in at least some pores 21 of porous preform 12. As shown in FIG. 3, one or more carrier materials 24 have been substantially removed (e.g., removed or nearly removed) as a result of the drying process, depositing solid particles 26, 28, 30 within the inner recesses of porous preform 12 (e.g., within pores 21). As slurry mixture 14 is dried, solid particles 26, 28, 30 may become more closely packed as the particles are deposited in porous preform 12. The drying process may be conducted in any suitable manner. For example, infiltrated-preform 36 may be dried at room temperature under vacuum at about 1 Torr, or may be dried at ambient pressure at a temperature of up to about 150° C.

In some examples, the slurry infiltration/drying process may also form an outer surface layer 32 of solid particles 26, 28, 30 on porous preform 12. In such examples, the surface layer formed by slurry mixture 14 may up to about 750 μm thick as measured normal to the outer surface 22 of porous preform 12. In some such examples, the formation of outer surface layer 32 may help protect porous preform 12 during subsequent processing (e.g., machining) by acting as a buffer layer between outer surface 22 of porous preform 12 and the external environment. In some examples, outer surface layer 32 may be less than about 125 μm or may be substantially indistinguishable from outer surface 22 of porous preform 12 (e.g., outer surface layer 32 may not be present on outer surface 22 of porous preform 12). In some examples, outer surface layer 32 formed by deposition of slurry mixture 14 may form a more uniform (e.g., planar or smooth) surface compared to outer surface 22 of porous preform 12. In some such examples, the uniformity (e.g., flatness or smoothness) of outer surface layer 32 may improve the adhesion of subsequent coatings applied to the resultant CMC article including, for example, optional bond coat 44, environmental barrier coating 46, or the like discussed further below.

Figure 4:
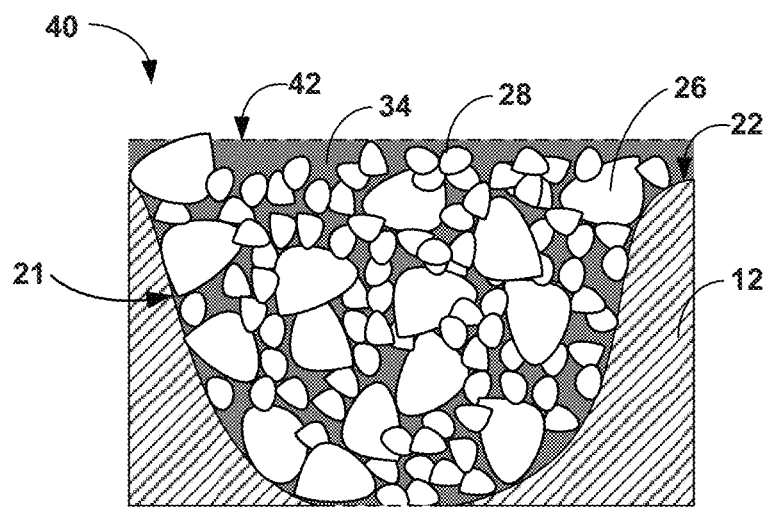
FIG. 4 is a conceptual diagram of a pore of the example infiltrated-preform of FIG. 3 showing an infiltrated-preform after being subjected to a subsequent melt infiltration process.

Following infiltration of porous preform 12 with slurry mixture 14 and subsequent drying, infiltrated-preform 36 may be subjected to a subsequent melt infiltration cycle in which molten metal or metal alloy is deposited on the exterior surface 42 of infiltrated-preform 36 and allowed to or forced to infiltrate the preform and react with diamond particles 30 to form metal carbide. FIG. 4 is a conceptual diagram of pore 21 of FIG. 3 (e.g., illustrating an enlargement of article 10 of FIG. 1) showing infiltrated-preform 36 after being subjected to a subsequent melt infiltration process. As shown in FIG. 4, diamond particles 30 have been converted as a result of reacting with the metal or metal alloy to form metal carbide material 34 amid the pathways between coarse ceramic particles 26 and fine ceramic particles 28 to produce final densified CMC article 40.

In some examples, the molten metal infiltrant may include Si metal or Si metal alloy, B metal or B metal alloy, Al metal or Al metal alloy, Y metal or Y metal alloy, Ti metal or Ti metal alloy, Zr metal or Zi metal alloy, or the like. In some examples, the molten metal infiltrant includes Si metal or Si metal alloy (e.g., Si and BN powder).

Figure 5:
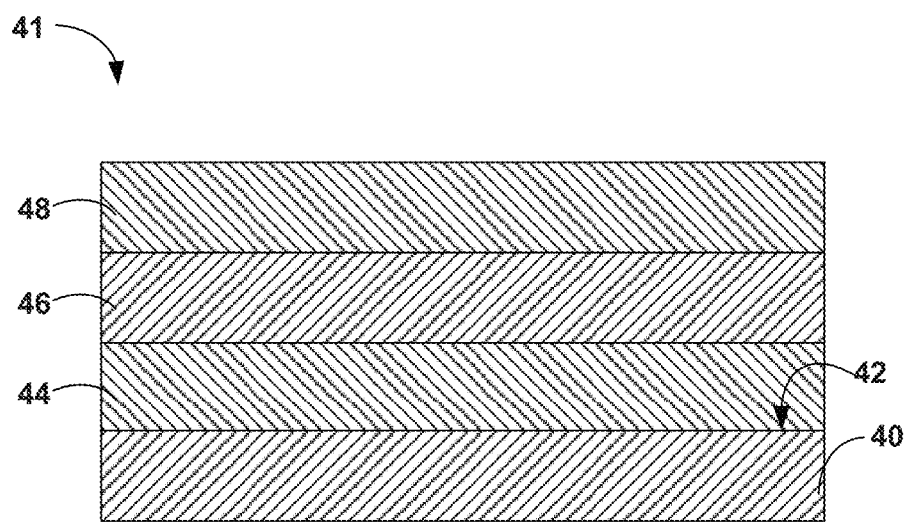
FIG. 5 is conceptual diagram illustrating a cross-sectional view of an example CMC article with one or more optional coatings.

In some examples, resultant CMC article 40 may also include one or more optional outer coatings applied one or more of the exterior surfaces 42 as shown in FIG. 5, which is conceptual diagram illustrating a cross-sectional view of CMC article 40 with one or more optional coatings ("coated CMC article 41"). The one or more optional coatings including may include, for example, a bond coat 44, an environmental barrier coating (EBC) 46, an abradable coating layer 50, or the like. In some examples, a single layer of the one or more optional outer coatings may perform two or more of these functions.

In some examples, CMC article 40 may include bond coat 44 that includes any useful material to improve adhesion between two or more adjacent layers of coated CMC article 41. In some examples, bond 44 coat may include silicon metal, alone, or mixed with at least one other constituent including, for example, at least one of a transition metal carbide, a transition metal boride, or a transition metal nitride; mullite (aluminum silicate, $Al_6Si_2O_{13}$), silica, a silicide, a rare earth silicate, a rare earth oxide, or the like. Bond coat 44 may be formed on exterior surface 42 using, for example, plasma spraying, physical vapor deposition (PVD), electron beam physical vapor deposition (EB-PVD), directed vapor deposition (DVD), chemical vapor deposition (CVD), cathodic arc deposition, slurry deposition, sol-gel deposition, electrophoretic deposition, or the like.

Additionally or alternatively, the one or more optional outer coatings on CMC article 40 may include EBC 46, which may provide environmental protection, thermal protection, and/or CMAS-resistance to CMC article 40. EBC 46 may include at least one of a rare earth oxide, a rare earth silicate, an aluminosilicate, or an alkaline earth aluminosilicate. For example, EBC 46 may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth oxide includes an oxide of at least one of Yb, Y, Gd, or Er.

In some examples, EBC 46 may include at least one rare earth oxide and alumina, at least one rare earth oxide and silica, or at least one rare earth oxide, silica, and alumina. In some examples, EBC 46 may include an additive in addition to the primary constituents of the coating. For example, EBC 46 may include at least one of $TiO_2$, $Ta_2O_5$, $HfSiO_4$, an alkali metal oxide, or an alkali earth metal oxide. The additive may be added to EBC 46 to modify one or more desired properties of the coating. For example, the additive components may increase or decrease the reaction rate of EBC 46 with CMAS, may modify the viscosity of the reaction product from the reaction of CMAS and EBC 46, may increase adhesion of EBC 46 to bond coat 44 or exterior surface 42, may increase or decrease the chemical stability of EBC 46, or the like.

In some examples, EBC 46 may be substantially free (e.g., free or nearly free) of hafnia and/or zirconia. Zirconia and hafnia may be susceptible to chemical attack by CMAS, so an EBC 46 substantially free of hafnia and/or zirconia may be more resistant to CMAS attack than EBC 46 that includes zirconia and/or hafnia.

In some examples, EBC 46 may have a dense microstructure, a columnar microstructure, or a combination of dense and columnar microstructures. A dense microstructure may be more effective in preventing the infiltration of CMAS and other environmental contaminants, while a columnar microstructure may be more strain tolerant during thermal cycling. A combination of dense and columnar microstructures may be more effective in preventing the infiltration of CMAS or other environmental contaminants than a fully columnar microstructure while being more strain tolerant during thermal cycling than a fully dense microstructure. In some examples, EBC 46 with a dense microstructure may have a porosity of less than about 20 vol. %, such as less than about 15 vol. %, less than 10 vol. %, or less than about 5 vol. %, where porosity is measured as a percentage of pore volume divided by total volume of EBC 46.

Additionally or alternatively, the one or more optional outer coatings on CMC article 40 may include an abradable layer 48. The abradable layer may include at least one of a rare earth oxide, a rare earth silicate, an aluminosilicate, or an alkaline earth aluminosilicate. For example, abradable layer 48 may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth oxide includes an oxide of at least one of Yb, Y, Gd, or Er.

In some examples abradable layer 48 may be porous. Porosity of abradable layer 48 may reduce a thermal conductivity of the abradable layer and/or may affect the abradability of the layer. In some examples, abradable layer 48 includes porosity between about 10 vol. % and about 50 vol. %. In other examples, abradable layer 48 includes porosity between about 15 vol. % and about 35 vol. %, or about 20 vol. %. Porosity of abradable layer 48 is defined herein as a volume of pores or cracks in the abradable layer divided by a total volume of the abradable layer (including both the volume of material in the abradable layer and the volume of pores/cracks in the abradable layer).

Abradable layer 48 may be formed using, for example, a thermal spraying technique, such as, for example, plasma spraying. Porosity of abradable layer 48 may be controlled by the use of coating material additives and/or processing techniques to create the desired porosity. In some examples, substantially closed pores may be desired.

In some examples, a coating material additive that melts or burns at the use temperatures of the component (e.g., a blade track) may be incorporated into the coating material that forms abradable layer 48. The coating material additive may include, for example, graphite, hexagonal boron nitride, or a polymer such as a polyester, and may be incorporated into the coating material prior to deposition of the coating material on exterior surface 42 or, if present, the other optional coating layers, to form abradable layer 48. The coating material additive then may be melted or burned off in a subsequent heat treatment, or during operation of the gas turbine engine, to form pores in abradable layer 48. The post-deposition heat-treatment may be performed at up to about 1500° C.

The porosity of abradable layer 48 can also be created and/or controlled by plasma spraying the coating material using a co-spray process technique in which the coating material and coating material additive are fed into the plasma stream with two radial powder feed injection ports. The feed pressures and flow rates of the coating material and coating material additive may be adjusted to inject the material on the outer edge of the plasma plume using direct 90 degree angle injection. This may permit the coating material particles to soften but not completely melt and the coating material additive to not burn off but rather soften sufficiently for adherence in abradable layer 48.

Figure 6:
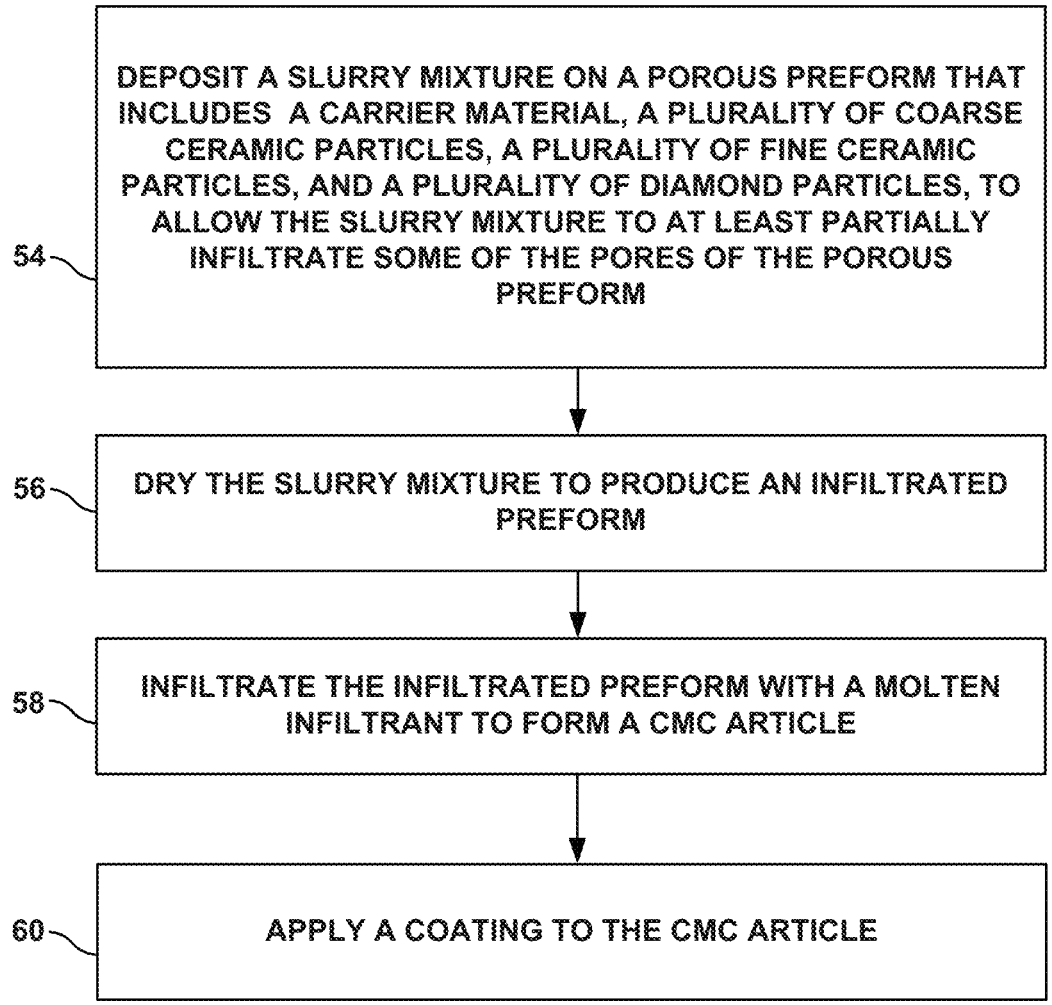
FIG. 6 is a flow diagram illustrating an example technique for forming a CMC article.

FIG. 6 is a flow diagram illustrating an example technique for forming CMC article 40 via the deposition and drying of slurry mixture 14 and subsequent melt infiltration process. While technique of FIG. 6 is described with concurrent reference to the conceptual diagram of FIGS. 1-5, in other examples, the technique of FIG. 6 may be used to form another CMC article, or CMC article 40 may be formed using a technique different than that described in FIG. 6.

The technique of FIG. 6 includes depositing a slurry mixture 14 on porous preform 12, allowing slurry mixture to at least partially infiltrate at least some pores 21 of porous preform 12 (54). Porous preform 12 may be manufactured using one or more of the techniques discussed above. Additionally or alternatively, porous preform 12 may be acquired in prefabricated form.

As described above, slurry mixture 14 may include carrier material 24, plurality of coarse ceramic particles 26, plurality of fine ceramic particles 28, and plurality of diamond particles 30. In some examples, slurry mixture 14 may be formulated to include about 30 vol. % to about 60 vol. % of carrier material 24 and about 70 vol. % to about 40 vol. % solid materials (e.g., solid particles 26, 28, 30). In some examples, coarse ceramic particles 26 may account for about 40 vol. % to about 50 vol. % of the solid materials in slurry mixture 14, fine ceramic particles 28 may account for about 40 vol. % to about 59 vol. % of the solid materials in slurry mixture 14, and diamond particles 30 may account for about 1 vol. % to about 10 vol. % the solid material in slurry mixture 14. The contents of slurry mixture 14 may be combined and thoroughly mixed prior to deposition. In some examples slurry mixture may exhibit a viscosity less than about 1000 cP.

Slurry mixture 14 may be applied to porous preform 12 using any suitable technique that allows solid particles 26, 28, 30 to at least partially infiltrate the inner spaces (e.g., pores 21) of porous preform 12. In some examples, slurry mixture 14 may be applied to porous preform 12 using a mold to assist with the infiltration process (54). In some such examples, porous preform 12 may be placed and sealed within the mold and subsequently injected with slurry mixture 14 (54).

Once infiltrated, slurry mixture 14 may be dried (56) to substantially fully remove the one or more carrier materials 24 from slurry mixture 14, thereby leaving behind the solid materials of slurry mixture 14 (e.g., solid particles 26, 28, 30) in at least some pores 21 of porous preform 12. The drying process results in infiltrated-preform 36 (56). The drying process may be conducted in any suitable manner. For example, infiltrated-preform 36 may be dried at room temperature under vacuum at about 1 Torr, or may be dried at ambient pressure at a temperature of up to about 150° C.

The technique of FIG. 6 also includes infiltrating infiltrated-preform 36 with a molten metal infiltrant to form CMC article 40 (58). The molten metal infiltrant may include a molten metal or molten alloy including, for example, Si metal or Si metal alloy, B metal or B metal alloy, Al metal or Al metal alloy, Y metal or Y metal alloy, Ti metal or Ti metal alloy, Zr metal or Zi metal alloy, or the like. In some examples, the molten metal infiltrant includes Si metal or Si metal alloy. The molten metal infiltrant may wick between solid particles 26, 28, 30 to infiltrate infiltrated-preform 36 and react with diamond particles 30, thereby at least partially converting diamond particles 30 to metal carbide material 34 (e.g., SiC). The resultant metal carbide material 34 may occupy the interstices between the respective coarse and fine ceramic particles 26 and 28 to help densify CMC article 40. Additionally or alternatively, the unique combination of solid particles 26, 28, 30 may help reduce or inhibit the formation of silicon nodules on exterior surface 42 of CMC article 40 by, for example, reducing the quantity of molten metal infiltrant material used during the melt infiltration process, improving the conversion free molten metal infiltrant to metal carbide (e.g., silicon to SiC) during the melt infiltration process, reducing the quantity of excess molten metal infiltrant material that remains in infiltrated-preform 36 after the melt infiltration process, constricting or impeding the interstices between coarse and fine ceramic particle 26 and 28 as diamond particles 30 are converted to metal carbide material 34, or a combination thereof. In some examples, the melt infiltration process (58) may densify the resultant composite article to define an average porosity of less than about 5%, or less than about 3%, or less than about 1%.

In some examples, the temperature for metal alloy infiltration such as Si metal infiltration is between about 1400° C. and about 1500° C. Under these conditions, the duration of the infiltration may be between about 15 minutes and about 4 hours, or between about 20 minutes and about 60 minutes. The melt infiltration process (58) may optionally be carried out under vacuum, but in other examples can be carried out in inert gas under atmospheric pressure to limit evaporation losses.

In some examples, after the melt infiltration step (58), one or more optional outer coatings may be applied to resultant CMC article 40 (60). As describe above, the one or more optional coatings may include a bond coat 44, an EBC 46, an abradable layer 48, or the like using one or more of the techniques discussed above.

EXAMPLES

Example 1

Figure 7:
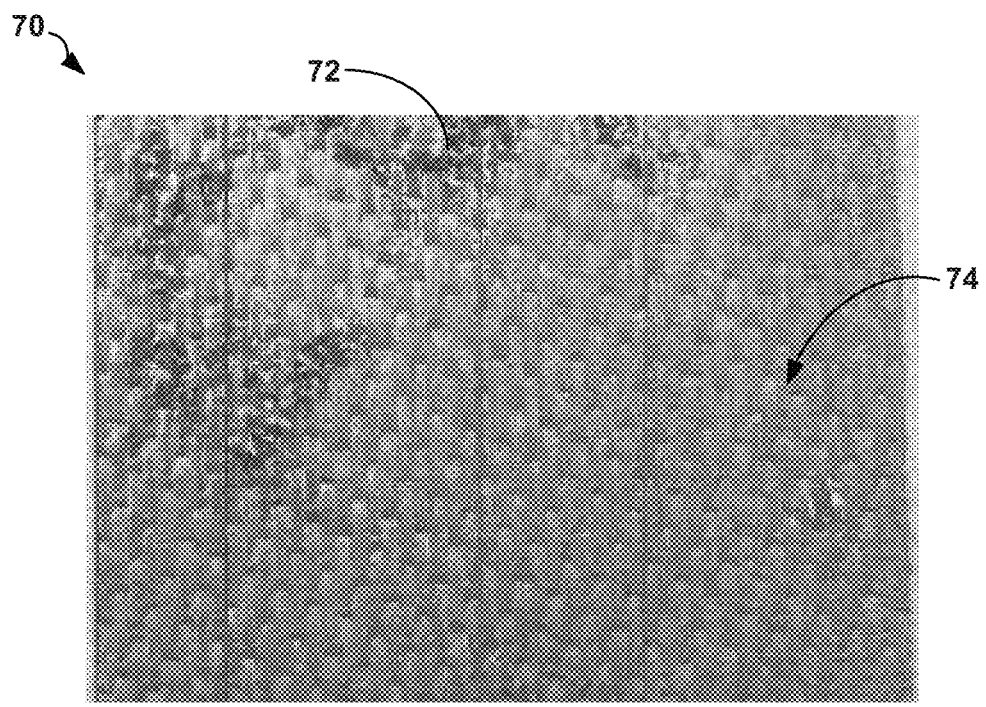
FIG. 7 is a photograph of a comparative example CMC article of a porous preform that had been initially infiltrated with a slurry, dried, and subsequently infiltrated with molten silicon alloy.

FIG. 7 is a photograph of a comparative example CMC article 70 including a porous preform that had been initially infiltrated with a slurry, dried, and subsequently infiltrated with molten silicon alloy. The porous preform of article 70 included a SiC fiber based preform. The slurry applied to article 70 included a plurality of coarse ceramic particles, a plurality of fine ceramic particles, and diamond particles. The coarse ceramic particles applied to article 70 defined an average coarse particle diameter of 16 μm and accounted for 75 vol. % of the solid materials of the slurry mixture. The fine ceramic particles applied to article 70 defined an average fine particle diameter of 3 μm and accounted for 23 vol. % of the solid materials of the slurry mixture. The diamond particles applied to article 70 defined an average particle diameter of 2.5 μm and accounted for 2 vol. % of the solid materials of the slurry mixture. The molten metal infiltrant applied to article 70 included a silicon alloy (including about 96 wt. % to about 99.5 wt. % of Si). As shown in FIG. 7, article 70 includes several silicon nodules 72 the formed on the exterior surface 74 of article 70 as a result of the melt infiltration process.

Figure 8:
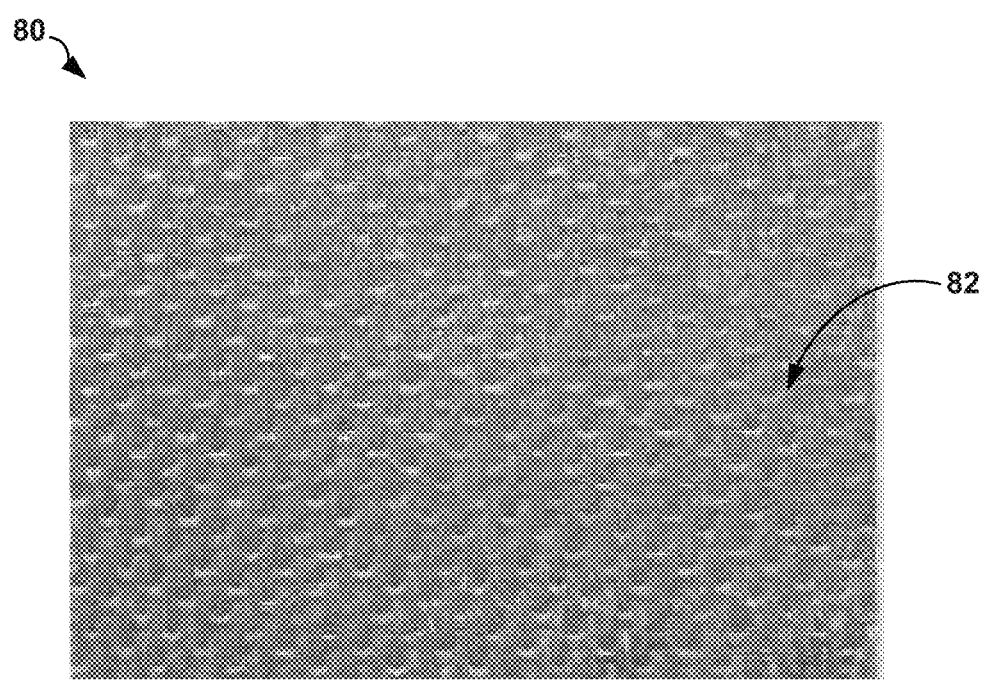
FIG. 8 is a photograph of an example CMC article of a porous preform that had been initially infiltrated with a slurry, dried, and subsequently infiltrated with molten silicon alloy.

FIG. 8 is a photograph of an example CMC article 80 including a porous preform that had been initially infiltrated with a slurry, dried, and subsequently infiltrated with molten silicon alloy. The porous preform of article 80 included a SiC fiber based preform. The slurry applied to article 80 included a plurality of coarse ceramic particles, a plurality of fine ceramic particles, and diamond particle. The coarse ceramic particles applied to article 80 defined an average coarse particle diameter of 16 μm and accounted for 50 vol. % of the solid materials of the slurry mixture. The fine ceramic particles applied to article 80 defined an average fine particle diameter of 3 μm and accounted for 48 vol. % of the solid materials of the slurry mixture. The diamond particles applied to article 80 defined an average diamond particle diameter of 2.5 μm and accounted for 2 vol. % of the solid materials of the slurry mixture. The molten metal infiltrant applied to article 80 included a silicon alloy (including about 96 wt. % to about 99.5 wt. % of Si). As shown in FIG. 8, the presence of silicon nodules 72 on the exterior surface 82 of article 80 has been substantially reduced compared to article 70.

Various examples have been described. These and other examples are within the scope of the following claims.

What is claimed is:

1. A method comprising:
   infiltrating a porous preform with a slurry to form an infiltrated-preform, wherein the slurry comprises a plurality of solid particles, and wherein the plurality of solid particles comprise a plurality of fine ceramic particles defining an average fine particle diameter, a plurality of coarse ceramic particles defining an average coarse particle diameter, and a plurality of diamond particles, wherein the average fine particle diameter is less than the average coarse particle diameter; and
   infiltrating the infiltrated-preform with a molten metal infiltrant to form a ceramic matrix composite (CMC) article, wherein the molten metal infiltrant reacts with the diamond particles to form a metal carbide material, and wherein substantially all of the plurality of diamond particles are converted to the metal carbide as a result of the infiltrating the infiltrated-preform with the molten metal infiltrant.

2. The method of claim 1, wherein the plurality of solid particles comprise between about 1 percent by volume (vol. %) and about 10 vol. % of the plurality of diamond particles.

3. The method of claim 1, wherein the plurality of diamond particles define an average diamond particle diameter between about 0.1 micrometers (μm) and about 5 μm.

4. The method of claim 1, wherein the plurality of solid particles comprise between about 40 percent by volume (vol. %) and about 50 vol. % of the plurality of coarse ceramic particles.

5. The method of claim 1, wherein the plurality of coarse ceramic particles define an average coarse particle diameter between about 10 micrometers (μm) and about 20 μm.

6. The method of claim 1, wherein the plurality of solid particles comprise between about 40 percent by volume (vol. %) and about 59 vol. % of the plurality of fine ceramic particles.

7. The method of claim 1, wherein the plurality of fine ceramic particles define an average fine particle diameter between about 0.5 micrometers (μm) to about 5 μm.

8. The method of claim 1, wherein at least one of the plurality of coarse ceramic particles or the plurality of fine ceramic particles comprise at least one of boron carbide, silicon carbide, silicon nitride, or molybdenum carbide.

9. The method of claim 1, wherein the slurry further comprises at least one carrier material, and wherein the solid particles comprise about 40 percent by volume (vol. %) to about 70 vol. % of the slurry.

10. The method of claim 1, wherein the slurry defines a viscosity of less than about 1000 centipoise.

11. The method of claim 1, wherein the molten infiltrant comprises silicon or silicon alloy.

12. The method of claim 1, wherein at least one of the plurality of coarse ceramic particles or the plurality of fine ceramic particles comprise at least one of boron carbide, silicon nitride, or molybdenum carbide.

13. The method of claim 1, wherein a combination of the fine ceramic particles, the coarse ceramic particle, and the diamond particles inhibit a formation of nodules on an exterior surface of the CMC article following the infiltration of the infiltrated-preform with the molten metal infiltrant.

14. The method of claim 1, wherein the plurality of diamond particles inhibit a formation of nodules on an exterior surface of the CMC article following the infiltration of the infiltrated-preform with the molten metal infiltrant by at least reacting with the molten metal infiltrant to form the metal carbide material.

15. The method of claim 1, further comprising forming at least one of a bond layer, environmental barrier coating, or abradable layer on the CMC article.

16. The method of claim 1, wherein the plurality of diamond particles exhibit at least one of a calcium impurity content of less than about 0.05 percent by weight (wt. %) and an iron impurity content of less than about 0.05 wt. %.

17. The method of claim 1, wherein the metal carbide material substantially fills the interstices between the coarse particles, the fine particles, and the porous preform after the infiltration of the infiltrated-preform with the molten metal or metal alloy.

18. A method comprising:
    infiltrating a porous preform with a slurry to form an infiltrated-preform, wherein the slurry comprises a plurality of solid particles, and wherein the plurality of solid particles comprise a plurality of fine ceramic particles defining an average fine particle diameter, a plurality of coarse ceramic particles defining an average coarse particle diameter, and a plurality of diamond particles, wherein the average fine particle diameter is less than the average coarse particle diameter; and
    infiltrating the infiltrated-preform with a molten silicon or silicon alloy infiltrant to form a ceramic matrix composite (CMC) article, wherein a combination of the fine ceramic particles, the coarse ceramic particle, and the diamond particles inhibit a formation of silicon nodules on an exterior surface of the CMC article, wherein the molten silicon or silicon alloy infiltrant reacts with the diamond particles to form a silicon carbide material, and wherein substantially all of the plurality of diamond particles are converted to the metal carbide as a result of the infiltrating the infiltrated-preform with the molten silicon or silicon alloy infiltrant.

19. The method of claim 18, wherein the plurality of diamond particles inhibit the formation of silicon nodules on the exterior surface of the CMC article following the infiltration of the infiltrated-preform with the molten silicon or silicon alloy infiltrant by at least reacting with the molten silicon or silicon alloy infiltrant to form the silicon carbide material.

20. A method comprising:
   infiltrating a porous preform with a slurry to form an infiltrated-preform, wherein the slurry comprises a plurality of solid particles, and wherein the plurality of solid particles comprise a plurality of fine ceramic particles defining an average fine particle diameter, a plurality of coarse ceramic particles defining an average coarse particle diameter, and a plurality of diamond particles, wherein the average fine particle diameter is less than the average coarse particle diameter; and infiltrating the infiltrated-preform with a molten metal infiltrant to form a ceramic matrix composite (CMC) article, wherein the molten metal infiltrant reacts with the diamond particles to form a metal carbide material, wherein substantially all of the plurality of diamond particles are converted to the metal carbide as a result of the infiltrating the infiltrated-preform with the molten metal infiltrant, wherein the plurality of solid particles comprise between about 1 percent by volume (vol. %) and about 10 vol. % of the plurality of diamond particles, wherein the plurality of solid particles comprise between about 40 percent by volume (vol. %) and about 50 vol. % of the plurality of coarse ceramic particles, and wherein the plurality of solid particles comprise between about 40 percent by volume (vol. %) and about 59 vol. % of the plurality of fine ceramic particles.

\* \* \* \* \*